US011838788B2

(12) United States Patent
Kwon et al.

(10) Patent No.: US 11,838,788 B2
(45) Date of Patent: Dec. 5, 2023

(54) APPARATUS AND METHODS OF ACCESS POINT OPERATION IN MULTI-LINK WIRELESS COMMUNICATION SYSTEMS

(71) Applicant: NXP USA, Inc., Austin, TX (US)

(72) Inventors: Young Hoon Kwon, Laguna Niguel, CA (US); Liwen Chu, San Ramon, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 3 days.

(21) Appl. No.: 17/538,639

(22) Filed: Nov. 30, 2021

(65) Prior Publication Data

US 2022/0174536 A1 Jun. 2, 2022

Related U.S. Application Data

(60) Provisional application No. 63/135,005, filed on Jan. 8, 2021, provisional application No. 63/119,164, filed on Nov. 30, 2020.

(51) Int. Cl.
  *H04W 28/02* (2009.01)
  *H04L 5/16* (2006.01)
  *H04L 5/18* (2006.01)

(52) U.S. Cl.
  CPC .......... *H04W 28/0268* (2013.01); *H04L 5/16* (2013.01); *H04L 5/18* (2013.01)

(58) Field of Classification Search
  CPC ......... H04W 28/0268; H04L 5/16; H04L 5/18
  See application file for complete search history.

(56) References Cited

U.S. PATENT DOCUMENTS

| | | | | |
|---|---|---|---|---|
| 2021/0007168 | A1* | 1/2021 | Asterjadhi | H04W 52/0216 |
| 2021/0014911 | A1* | 1/2021 | Patil | H04W 8/245 |
| 2021/0051513 | A1* | 2/2021 | Min | H04W 72/21 |
| 2021/0112543 | A1* | 4/2021 | Das | H04W 8/22 |
| 2021/0259033 | A1* | 8/2021 | Kim | H04W 76/11 |
| 2021/0314292 | A1* | 10/2021 | Seok | H04W 8/24 |
| 2021/0337613 | A1* | 10/2021 | Seok | H04W 48/16 |
| 2022/0272630 | A1* | 8/2022 | Shafin | H04W 52/0219 |
| 2023/0126846 | A1* | 4/2023 | Ratnam | H04W 76/15 370/311 |

OTHER PUBLICATIONS

Power Point of Terminology for Soft AP MLD; Jul. 8, 2020; 9 pages.
Dorothy Stanley, "802.11 Working Group Opening Report," Jul. 2020; 28 pages.
Edward Au, "Specification Framework for TGbe," IEEE P802.11 Wireless LANs; Aug. 2020; 46 pages.

* cited by examiner

*Primary Examiner* — Bailor C Hsu

(57) ABSTRACT

Various embodiments relate to a method for a non simultaneous transmit and receive (NSTR) soft access point (AP) multi-link device (MLD) negotiating a traffic identifier (TID)-to-link mapping with a non-AP MLD, including: transmitting, by the NSTR soft AP MLD, a first frame that includes information on a first group of links that the NSTR soft AP MLD proposes to map to a first TID for the non-AP MLD; receiving, by the NSTR soft AP MLD, a second frame that includes an indication that the non-AP MLD agrees with the NSTR soft AP MLD's proposal on mapping of the first TID to the first group of links; and transmitting, by the NSTR soft AP MLD, traffic to the non-AP MLD on the first group of links based on the mapping.

13 Claims, 1 Drawing Sheet

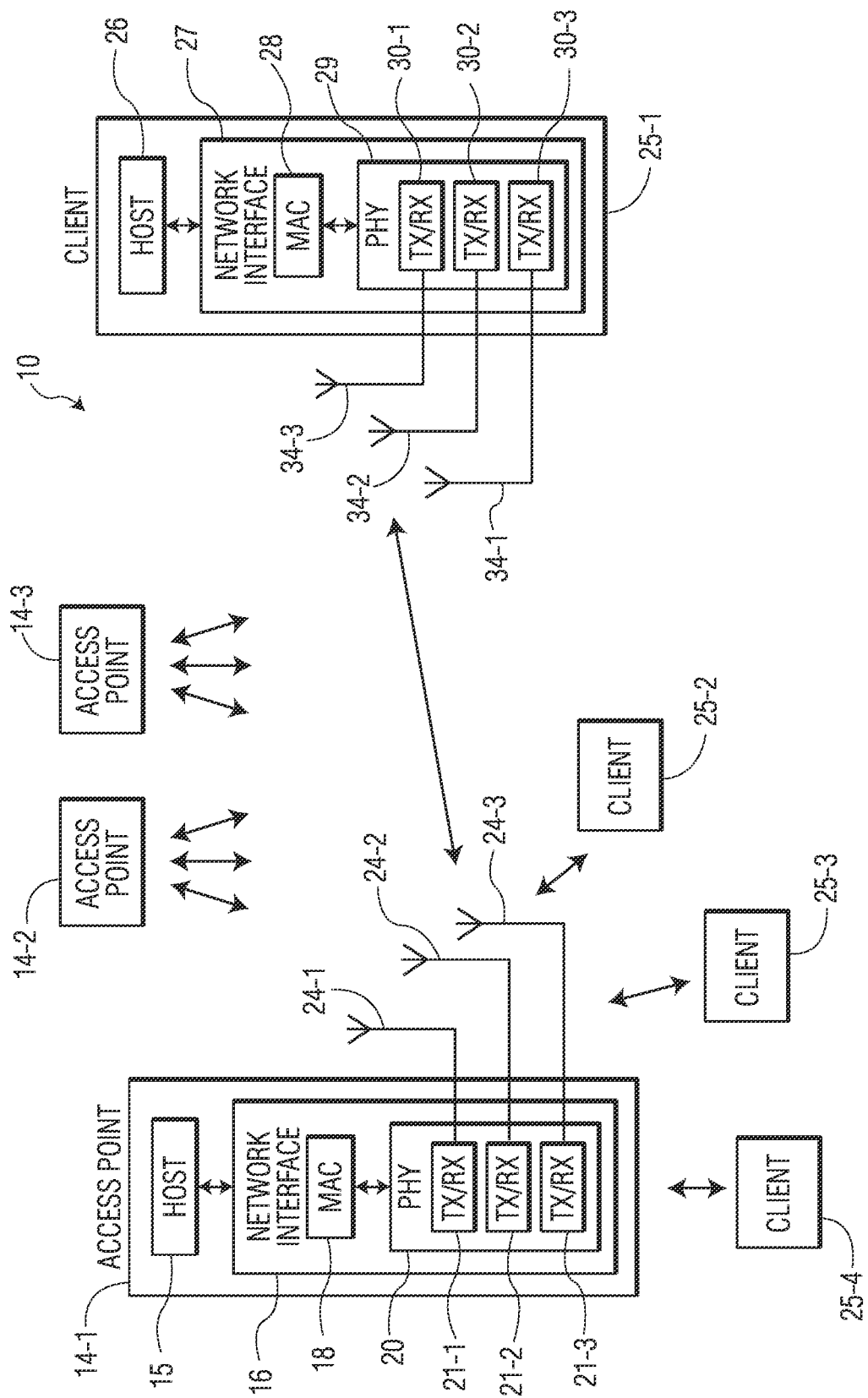

APPARATUS AND METHODS OF ACCESS POINT OPERATION IN MULTI-LINK WIRELESS COMMUNICATION SYSTEMS

CROSS-REFERENCE TO RELATED APPLICATIONS

This application claims benefit to U.S. Provisional Patent Application Nos. 63/119,164 filed on Nov. 30, 2020, and 63/135,005 filed on Jan. 8, 2021, the contents of which are hereby incorporated by reference for all purposes as if fully set forth herein.

TECHNICAL FIELD

Various exemplary embodiments disclosed herein relate generally to apparatus and methods of access point operation in multi-link wireless communication systems.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for a non simultaneous transmit and receive (NSTR) soft access point (AP) multi-link device (MLD) negotiating a traffic identifier (TID)-to-link mapping with a non-AP MLD, including: transmitting, by the NSTR soft AP MLD, a first frame that includes information on a first group of links that the NSTR soft AP MLD proposes to map to a first TID for the non-AP MLD, wherein the first group of links includes a first link from a first set of links, wherein the first set of links is a set of links on which APs affiliated with the soft AP MLD operates and non-EHT STAs or single link STAs can associate with the APs; receiving, by the NSTR soft AP MLD, a second frame that includes an indication that the non-AP MLD agrees with the NSTR soft AP MLD's proposal on mapping of the first TID to the first group of links; determining, by the NSTR soft AP MLD, that traffic to the non-AP MLD has a first the first TID that is mapped to the first group of links; and transmitting, by the NSTR soft AP MLD, the traffic to the non-AP MLD on the first group of links.

Various embodiments are described, wherein a second set of links is a set of links on which APs affiliated with the soft AP MLD operates and non-EHT STAs or single link STAs cannot associate with the APs.

Various embodiments are described, wherein the first set of links and the second set of links satisfy at least one of the following conditions: a link shall be a member of the first set of links and has no corresponding link in the second set of links if it operates as an STR link pair with any other links in the soft AP MLD link set; a link may be a member of the first set of links and has one or more corresponding links in the second set of links if it operates as an NSTR link pair with at least one other link in the soft AP MLD link set; any link operates as an NSTR link pair with a link in the first set of links is a corresponding link to the link; any link operates as an NSTR link pair with a corresponding link to a link in the first set of links is also a conditional link to the link; and a link in the second set of links shall only have one corresponding link in the first set of links.

Various embodiments are described, further comprises aligning a target beacon transmission time (TBTT) of a first beacon frame on the first link in the first set of links with a TBTT of a second beacon frame on the second set of links.

Various embodiments are described, wherein group addressed frame transmission is limited to links in the first set of links.

Various embodiments are described, further including transmitting, by the NSTR soft AP MLB, one of a beacon frame or a probe response frame on a link, wherein the one of the beacon frame and probe response frame include a first indication whether the link is a member of the first set of links.

Various embodiments are described, further including transmitting, by the NSTR soft AP MLB, one of a beacon frame or a probe response frame on the link, wherein the one of the beacon frame and probe response frame include a second indication whether each link of a set of links associated with the soft AP MLD is a member of the first set of links.

Various embodiments are described, wherein the first indication is indicated by one of an extreme high throughput (EHT) capabilities element, one bit of information, and a value of a link ID of the link.

Various embodiments are described, wherein the second indication is indicated by one of a reduce neighbor report element, one bit of information, and the link ID of the link.

Further various embodiments relate to a method for a non simultaneous transmit and receive (NSTR) soft access point (AP) multi-link device (MLD) negotiating a traffic identifier (TID)-to-link mapping with a non-AP MLD, including: receiving, by the NSTR soft AP MLD, a first frame that includes an information on a first group of links that the non-AP MLD requests to map to a first TID, wherein the first group of links includes a first link from a second set of links, wherein the second set of links is a set of links on which APs affiliated with the soft AP MLD operates and non-EHT STAs or single link STAs are not allowed to associate with the APs; identifying, by the NSTR soft AP MLD, the first group of links does not include a second link from a first set of links, wherein the first set of links is a set of links on which APs affiliated with the soft AP MLD operates and non-EHT STAs or single link STAs can associate with the APs, and wherein the first link and the second link form a NSTR link pair; transmitting, by the NSTR soft AP MLD, a second frame indicating that the request for mapping the first group of links to the first TID is not accepted.

Further various embodiments relate to a method for an access point (AP) multi-link device (MLD) transmitting a frame to a non-AP MLD that supports enhanced multi-link multiple radio (EMLMR) operation, including: associating, by the AP MLD, with the non-AP MLD; negotiating, by the AP MLD, a TID-to-link mapping with the non-AP MLD, wherein a first TID is mapped to a first link within EMLMR links of the non-AP MLD; receiving, by the AP MLD, a first frame from the non-AP MLD that indicates the non-AP MLD operates in EMLMR mode; and transmitting, by the AP MLD, a second frame to the non-AP MLD on a second link within EMLMR links of the non-AP MLD, wherein a TID of the second frame is the first TID.

Various embodiments are described, further comprising identifying that the non-AP MLD operates in EMLMR mode, wherein the AP MLD maps all TIDs to all links.

Various embodiments are described, further comprising identifying that the non-AP MLD operates in EMLMR mode, wherein the AP MLD maps the first TID to all links within EMLMR links of the non-AP MLD.

Further various embodiments relate to a non simultaneous transmit and receive (NSTR) soft access point (AP) multi-link device (MLD) configured to negotiate a traffic identifier (TID)-to-link mapping with a non-AP MLD, including: a network interface configured to: transmit a first frame that includes information on a first group of links that the NSTR soft AP MLD proposes to map to a first TID for the non-AP MLD, wherein the first group of links includes a first link from a first set of links, wherein the first set of links is a set of links on which APs affiliated with the soft AP MLD operates and non-EHT STAs or single link STAs can associate with the APs; receive a second frame that includes an indication that the non-AP MLD agrees with the NSTR soft AP MLD's proposal on mapping of the first TID to the first group of links; determine that traffic to the non-AP MLD has a first the first TID that is mapped to the first group of links; and transmit the traffic to the non-AP MLD on the first group of links.

Various embodiments are described, wherein a second set of links is a set of links on which APs affiliated with the soft AP MLD operates and non-EHT STAs or single link STAs cannot associate with the APs.

Various embodiments are described, wherein the first set of links and the second set of links satisfy at least one of the following conditions: a link shall be a member of the first set of links and has no corresponding link in the second set of links if it operates as an STR link pair with any other links in the soft AP MLD link set; a link may be a member of the first set of links and has one or more corresponding links in the second set of links if it operates as an NSTR link pair with at least one other link in the soft AP MLD link set; any link operates as an NSTR link pair with a link in the first set of links is a corresponding link to the link; any link operates as an NSTR link pair with a corresponding link to a link in the first set of links is also a conditional link to the link; and a link in the second set of links shall only have one corresponding link in the first set of links.

Various embodiments are described, wherein the network interface if further configured to align a target beacon transmission time (TBTT) of a first beacon frame on the first link in the first set of links with a TBTT of a second beacon frame on the second set of links.

Various embodiments are described, wherein group addressed frame transmission is limited to links in the first set of links.

Various embodiments are described, wherein the network interface if further configured to transmit one of a beacon frame or a probe response frame on a link, wherein the one of the beacon frame and probe response frame include a first indication whether the link is a member of the first set of links.

Various embodiments are described, wherein the network interface if further configured to transmit one of a beacon frame or a probe response frame on the link, wherein the one of the beacon frame and probe response frame include a second indication whether each link of a set of links associated with the soft AP MLD is a member of the first set of links.

Various embodiments are described, wherein the first indication is indicated by one of an extreme high throughput (EHT) capabilities element, one bit of information, and a value of a link ID of the link.

Various embodiments are described, wherein the second indication is indicated by one of a reduce neighbor report element, one bit of information, and the link ID of the link.

Further various embodiments relate to a non simultaneous transmit and receive (NSTR) soft access point (AP) multi-link device (MLD) configured to negotiate a traffic identifier (TID)-to-link mapping with a non-AP MLD, including: a network interface configured to: receive a first frame that includes an information on a first group of links that the non-AP MLD requests to map to a first TID, wherein the first group of links includes a first link from a second set of links, wherein the second set of links is a set of links on which APs affiliated with the soft AP MLD operates and non-EHT STAs or single link STAs are not allowed to associate with the APs; identify the first group of links does not include a second link from a first set of links, wherein the first set of links is a set of links on which APs affiliated with the soft AP MLD operates and non-EHT STAs or single link STAs can associate with the APs, and wherein the first link and the second link form a NSTR link pair; and transmit a second frame indicating that the request for mapping the first group of links to the first TID is not accepted.

Further various embodiments relate to an access point (AP) multi-link device (MLD) transmitting a frame to a non-AP MLD that supports enhanced multi-link multiple radio (EMLMR) operation, including: a network interface configured to: associate with the non-AP MLD; negotiate a TID-to-link mapping with the non-AP MLD, wherein a first TID is mapped to a first link within EMLMR links of the non-AP MLD; receive a first frame from the non-AP MLD that indicates the non-AP MLD operates in EMLMR mode; and transmit a second frame to the non-AP MLD on a second link within EMLMR links of the non-AP MLD, wherein a TID of the second frame is the first TID.

Various embodiments are described, wherein the network interface if further configured to identify that the non-AP MLD operates in EMLMR mode, wherein the AP MLD maps all TIDs to all links.

Various embodiments are described, wherein the network interface if further configured to identify that the non-AP MLD operates in EMLMR mode, wherein the AP MLD maps the first TID to all links within EMLMR links of the non-AP MLD.

BRIEF DESCRIPTION OF THE DRAWINGS

In order to better understand various exemplary embodiments, reference is made to the accompanying drawings, wherein:

FIG. 1 is a block diagram of an example wireless local area network (WLAN), according to an embodiment.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one non-AP MLD includes multiple affiliated STAs. Two or more of the STAs of an non-AP MLD 25 are configured to receive corresponding data streams that are transmitted simultaneously by the AP 14. Additionally, two or more of the STAs of an non-AP MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of an non-AP MLD 25 may transmit data streams simultaneously to the multiple APs of an AP MLD 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an orthogonal frequency division multiple access (OFDMA) resource unit (RU) that includes the different OFDM RUs modulated in respective sub-channel blocks of the OFDMA RU. In an embodiment, the AP 14 allocates different sub-channels to different client stations and forms the OFDMA RU that includes OFDM RUs directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM RUs via different space time streams of a MU-MIMO communication channel to a single user (SU) or multiple users. In an embodiment, the APs 14 allocates different sub-channels and space time streams to different client stations and forms the OFDM RUs and modulates the different OFDM RUs to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

In EHT, an AP may communication with various STAs having different bandwidths. Beamforming may be used with these various stations. Embodiments of how to perform null data packet (NDP) sounding will be described when the stations have various bandwidths and a wide bandwidth NDP is used for sounding wherein the bandwidth of the wide bandwidth NDP is greater than the bandwidth of some of the stations.

Starting with HE, OFDMA was defined to allow communication with multiple stations having various bandwidths, and with many users this provides many benefits by reducing the overhead required for a transmission to various stations individually. However, for a limited number of users and with dynamic packet lengths, OFDMA may not have benefits over multiple single-user transmissions, considering the traffic dynamics and extra control information that is required for the transmission. For one BSS with STAs that have a mix of operating bandwidths (BW), e.g. 20 MHz, 80 MHz, 160 MHz, or 320 MHz, a transmission to these various different BW STAs may beneficially be carried out using one wide-bandwidth OFDMA. For example, an OFMDA transmission to two 40 MHz STAs and one 80 MHz STA may be carried out using a 160 MHz OFMDA transmission. If the bandwidth required by the STAs is more than available in an OFMDA transmission, then the bandwidth used with each STA may be reduced as needed. Accordingly, each STA may be allocated RUs according to its device bandwidth. With sub-channel selective transmission (SST) enabled small-BW STAs, each small-BW STA can be allocated an RU size equal to its device BW on either primary or secondary sub-channels.

Beamforming may be used with OFDMA to further increase the performance of OFDMA due to increased beamforming gain. As a result, the modulation and coding scheme (MCS) may be enhanced or the range may be extended for each STA.

In MLD operation, simultaneous transmit and receive (STR) operation may be allowed. That is while one link is transmitting another link is receiving. Non-AP MLDs may be STR or non-STR (NSTR).

During the standardization process of IEEE 802.11 TGbe, the concept of softAP for MLD operation was agreed. In general, a soft AP represents a software enabled AP and implies a software enabling a device which has not been specifically made to be a router into a wireless AP. IEEE 802.11be defines mechanisms to support the operation of a Non-STR AP MLD in release 1 (R1). The mechanisms are limited to instantiate a Non-STR Non-AP MLD as a Soft AP that could utilize all its links under to be determined conditions. The exact language to govern such scope is also to be determined. If the device is a non-AP MLD and the device intends to operate as an AP MLD, this device becomes the soft AP MLD. However, when a non-AP MLD is a non-STR MLD defined in IEEE 802.11 TGbe, it imposes some issues for the soft AP MLD operation due to the restriction that the non-AP MLD cannot transmit and receive simultaneously on the non-STR link pair.

When a soft AP MLD is an NSTR MLD on at least one pair of links that the soft AP MLD is operating, the followings are assumptions apply in the description herein. A set of links that the soft AP MLD is operating on is called a soft AP MLD link set. A soft AP MLD link set includes two disjoint sets of links. A first set of links is a set of links on which AP(s) affiliated with the soft AP MLD is operating, wherein non-EHT STAs or single link STAs can associate with the AP(s). This first set of links may be called a basic link set. A second set of links is a set of links on which AP(s) affiliated with the soft AP MLD is operating, wherein non-EHT STAs or single link STAs are not allowed to associate with the AP(s). This second set of links may be called a conditional link set. In IEEE 802.11 TGbe, the following definitions were also mentioned regarding the first set of links and the second set of links. A Basic Link Set includes every pair of links in this set on which the Non-STR Soft AP MLD can simultaneously transmit and receive frames with another MLD(s). A Conditional Link Set includes the links, together with some links in the Basic Link Set, on which the Non-STR Soft AP MLD cannot simultaneously transmit and receive frames with another MLD(s). These links in the Basic Link Set are called the corresponding basic links for this conditional link.

Throughout the description herein, the first set of links and the second set of links satisfy some of the following conditions. A link shall be a member of the first set of links and has no corresponding link in the second set of links if it operates as an STR link pair with any other links in the soft AP MLD link set. A link may be a member of the first set of links and has one or more corresponding links in the second set of links if it operates as an NSTR link pair with at least one other link in the soft AP MLD link set. Any link operates in an NSTR link pair with a link in the first set of links is a corresponding link to the link. Any link that operates in an NSTR link pair with a corresponding link to a link in the first set of links is also a conditional link to the link. A link in the second set of links shall only have one corresponding link in the first set of links. Some of embodiments described herein assumes the above conditions. When a corresponding link is mentioned in embodiments, the correspondence relation is from the above conditions.

Traffic identifier (TID)-to-link mapping will now be described. TID-to-link mapping raises the following issues. The following points were agreed to in the IEEE 802.11 TGbe standard. IEEE 802.11be defines a directional-based TID-to-link mapping mechanism among the setup links of a MLD by mapping a TID to one or more links. The frames belonging to the TID are sent on the mapped link(s). Such traffic separation can aid latency sensitive traffic flow by assigning a high-volume, latency tolerant traffic flow to a subset of links while mapping latency sensitive flows to all links. This approach may increase channel access opportunities for a latency sensitive flow. At a system level, this reduces contention between latency sensitive and latency tolerant flows. Other uses of TID-to link mapping include load balancing, separating UL/DL flows, etc.

By default, after the multi-link setup, all TIDs are mapped to all setup links. This also applies when no explicit TID-to-link mapping is negotiated. Note, that it is optional for an MLD to support TID-to-link mapping negotiation The multi-link setup may include the TID-to-link mapping negotiation when TID-to-link mapping is supported by both MLDs. The AP MLD considers non-AP MLD's capabilities such as multi-link single radio (MLSR). For example, in the case of MLSR, all TIDs are mapped to all setup links. The AP MLD has the global view and considers BSS-wide conditions such as traffic profiles (e.g., latency sensitive flows) and load on each link to make mapping decisions for each STA. All clients are expected to benefit from such mapping.

The TID-to-link mapping may have the same or different link-set for each TID unless a non-AP MLD indicates that it requires the use of the same link-set for all TIDs during the multi-link setup phase. The TID-to-link mapping can be updated after multi-link setup through a negotiation, which can be initiated by any MLD. When the responding MLD cannot accept the update, it may reject the TID-to-link mapping update. However, when a TID-to-link mapping is negotiated between a non-AP MLD and a NSTR soft AP MLD, due to the existence of the second set of links, mapping a TID to certain combination of links may end up with a blindness issue on other links. For example, if there are three links between an AP MLD and a non-AP MLD, then the non-AP MLD may link a specific TID to two of the links during the TID-to-link mapping negotiation.

The following basic principles apply to TID-to-link mapping. When a non-AP MLD negotiates a TID-to-link mapping with a NSTR soft AP MLD, a set of links that a TID is mapped to shall include at least one link from the first set of links. When a non-AP MLD negotiates a TID-to-link mapping with a NSTR soft AP MLD, if a set of links that a TID is mapped to includes a first link from the second set of links, the set of links shall include a second link, wherein the first link and the second link form a NSTR link pair.

In another embodiment of TID-to-link mapping, the second link is a member of the first set of links. The first link is a corresponding link to the second link. The TID-to-link mapping for a NSTR soft AP MLD is then limited to "All TIDs are mapped to all links" only, and no TID-to-link mapping negotiation is allowed for a NSTR soft AP MLD.

Some operational examples will now be described. In a first operational example, a NSTR soft AP operates on two links (L1 and L2) where the legacy STAs and single link STAs are associated on L1. L1 is a member of the first set of links. Only EHT STAs are operating on L1 or L2, and L2 is a member of the second set of links. For a TID from a non-AP MLD, one of the following link mapping rules may be applied: the TID can be mapped to L1 only; the TID can be mapped to L1 and L2; or the TID cannot be mapped to L2 only.

In a second operational examples, a NSTR soft AP operates on three links (L1, L2, and L3). Legacy STAs and single link STAs are associated on L1 where L1 is a member of the first set of links. Only EHT STAs are operating on L2 and L3. L2 and L3 are a member of the second set of links. For a TID from a non-AP MLD, the one of the following link mapping rule may be applied: the TID can be mapped to L1 only; the TID can be mapped to L1 and L2; The TID can be mapped to L1 and L3; the TID can be mapped to L1, L2, and L3; the TID cannot be mapped to L2 only; the TID cannot be mapped to L3 only; or the TID cannot be mapped to L2 and L3.

Beacon frames are management frames that contain information about the network. Beacon frames are transmitted periodically, and they serve to announce the presence of a wireless LAN and to synchronize the members of the BSS. Beacon frames are transmitted by the access point (AP) in an infrastructure BSS. The following beacon frame issues may arise with the use of NSTR soft AP MLDs. When a Beacon frame is transmitted on a link in the second set of links from a NSTR soft AP MLD, the NSTR soft AP MLD cannot receive frames from STAs on another link in the first set of links if the link and the other link are NSTR link pair. Also, after the beacon transmission on the link, the NSTR soft AP cannot transmit frames on the other link that is in NSTR link pair with the link because it cannot detect the medium which leads to the channel blindness issue. The channel blindness issue implies that a STA MLD cannot update channel status on a link when the MLD transmits a frame on another link that is in a NSTR link pair with the link, therefore transmitting another frame on the other link right after the end of the transmission of the frame on the link may collide with an on-going frame exchange on the other link.

The basic principles of beacon transmission will now be described. The target beacon transmission time (TBTT) is the time at which a node must send a beacon. A first TBTT of a first beacon frame on a first link in the second set of links from a NSTR soft AP MLD shall be aligned (i.e., they start at the same time) with a second TBTT of a second Beacon frame on a second link in the first set of links from the NSTR soft AP MLD.

The following various embodiments are also possible. The first link and the second link form a NSTR link pair. A beacon interval of the first link is integer multiple of a beacon interval of the second link. The beacon interval of the first link is the same with a beacon interval of the second link. The difference between the first TBTT and the second TBTT shall be within a first predetermined value.

When group addresses (such as a broadcast address or a multi-cast address) is used for from transmission the following issues may arise. The following is agreed in the IEEE 802.11 TGbe specification. It is agreed that each AP in an AP MLD shall independently transmit all bufferable group addressed management frames after every delivery traffic indication map (DTIM) beacon in R1. Also, IEEE 802.11be supports the following group addressed frames delivery mechanism in R1: an AP MLD should not cause a STA affiliated to a non-STR non-AP MLD to transmit a MAC protocol data unit (MPDU) that overlaps with group addressed frames in a constrained link if another STA affiliated to the same non-STR non-AP MLD is expected to be receiving group addressed frames. These agreements are made based on assumptions that the serving AP MLD is STR MLD. However, due to the NSTR restriction of NSTR soft AP MLD, these rules may result in severe performance degradation for group addressed frame transmissions.

When group addressed frame transmission is used, for a NSTR soft AP MLD, the group addressed frame transmission is limited to a set of links that are members of the first set of links.

The following embodiments may also be used. The NSTR soft AP MLD shall schedule group addressed down link (DL) buffer unit (BU) delivery in all the links in the first set of links at which its affiliated APs generate Beacon frames. The group addressed DL BUs of another link shall be duplicated and scheduled for transmission in this link if at least one member non-AP MLD belonging to that group is expected to be receiving group addressed frames.

Soft AP indication will now be described. The following soft AP indication issues may arise. When a non-AP MLD receives a Beacon frame or a Probe Response frame from a NSTR soft AP MLD on a link, the non-AP MLD may identify basic information of the NSTR soft AP MLD such as the MLD ID and Link ID of each AP affiliated with the NSTR soft AP MLD. When the non-AP MLD tries to get further information about the NSTR soft AP MLD, the non-AP MLD may send a multi-link (ML) Probe Request frame that solicits a ML Probe Response frame to the NSTR soft AP MLD on the link. Also, when the non-AP MLD tries to associate with the NSTR soft AP MLD, the non-AP MLD may send an Association Request frame to the NSTR soft AP MLD on the link. However, if the link is a member of the second set of links, it is possible that the NSTR soft AP MLD will not respond back with the ML Probe Response frame or with an Association Response frame to the non-AP MLD on the link. Therefore, it will increase network overhead and delay for the non-AP MLD to be associated with the NSTR soft AP MLD.

The presence of a soft AP needs to be indicated. When a NSTR soft AP MLD transmits a Beacon frame or a Probe Response frame on a link, the Beacon frame or the Probe Response frame includes a first indication that the link is a member of the first set of links or not. When a NSTR soft AP MLD transmits a Beacon frame or a Probe Response frame on a link, the Beacon frame or the Probe Response frame includes a second indication that each link of the soft AP MLD link set is a member of the first set of links or not.

The following are various embodiment of how soft AP indication may be implemented. The first indication is indicated via EHT Capabilities element. The first indication is indicated by 1 bit information: the first state represents (e.g., '0') that the link is a member of the first set of links; and the second state represents (e.g., '1') that the link is not a member of the first set of links; or the second state represents that the link is a member of the second set of links.

In another embodiment, the first indication is indicated by Link ID of the link. If the Link ID of the link is a first group of IDs, it represents that the link is a member of the first set of links. If the Link ID of the link is a second group of IDs, it represents that the link is not a member of the first set of links. For example, if the Link ID of the link is below a predetermined value, it represents that the link is a member of the first set of links. For example, if the Link ID of the link is above a predetermined value, it represents that the link is a member of the first set of links. For example, if the Link ID of the link is an even number, it represents that the link is a member of the first set of links. For example, if the Link ID of the link is an odd number, it represents that the link is a member of the first set of links. For example, Link ID is composed of more than one part, and one part of the Link ID indicates if the link is a member of the first set of links or not e.g., a predefined bit of the Link ID indicates if the link is a member of the first set of links or not.

In another embodiment, the first indication is indicated if the Beacon frame and/or the Probe Response frame includes a third indication that an AP that transmits the Beacon frame and/or the Probe Response frame is a member of a NSTR soft AP MLD.

In another embodiment, the first indication is indicated if the Beacon frame and/or the Probe Response frame includes a third indication that any non-transmitted BSSID included in the Beacon frame and/or the Probe Response frame corresponds to an AP that is a member of a NSTR soft AP MLD.

Now TID-to-link mapping for enhanced multi-link multi-radio (eMLMR) operation will now be described. Also, an enhanced multi-link multi-radio (EMLMR) MLD is defined in IEEE 802.11 TGbe. A non-AP MLD may operate in the enhanced multi-link multi-radio (EMLMR) mode on a specified set of the enabled links between the non-AP MLD and its associated AP MLD. The specified set of the enabled links in which the EMLMR mode is applied is called EMLMR links. An MLD with dot11EHTEMLMROptionImplemented equal to true shall set the EMLMR Support subfield of the Multi-link element, which indicates MLD level capabilities, to 1; otherwise, the MLD shall set the EMLMR Support subfield to 0. A non-AP MLD with dot11EHTEMLMROptionImplemented equal to true shall set the EMLMR Rx NSS subfield of an element to dot11SupportedEMLMRRxNSS and the EMLMR Tx NSS subfield of an element to dot11SupportedEMLMRTxNSS, which indicate MLD level capabilities. A non-AP MLD with dot11EHTEMLMROptionImplemented equal to true operates in the EMLMR mode by signaling. A non-AP MLD with dot11EHTEMLMROptionImplemented equal to true may indicate its link switch delay in a Association/Probe Response management frame. When a non-AP MLD operates in the EMLMR mode, after initial frame exchange subject to its per-link spatial stream capabilities and operating mode on one of the EMLMR links, the non-AP MLD shall be able to support the following until the end of the frame exchange sequence initiated by the initial frame exchange: receive PPDUs with the number of spatial streams up to the value as indicated in the EMLMR Rx NSS subfield of Multi-Link element at a time on the link for which the initial frame exchange was made and transmit PPDUs with the number of space-time streams up to the value as indicated in the EMLMR Tx NSS subfield of Multi-Link element at a time on the link for which the initial frame exchange was made. After the end of the frame exchange sequence, each STA of the non-AP MLD in the EMLMR mode shall be able to transmit or receive PPDUs, subject to its per-link spatial stream capabilities and operating mode and any switching delay indicated by the non-AP MLD.

The following issues arise in TID-to-link signal for EMLMR operation. If a non-default TID-to-link mapping is negotiated between an AP MLD and a non-AP MLD that is capable of EMLMR operation, following issues may occur. If different TIDs are mapped to different links within the EMLMR links, the AP MLD cannot choose the best link within the EMLMR links due to the restrictions imposed by the TID-to-Link mapping. If the AP MLD has buffered BUs of multiple TIDs, where a first set of buffered BUs corresponds to a TID that is mapped to a first link within the EMLMR links and a second set of buffered BUs corresponds to another TID that is mapped to a second link within the EMLMR links, the AP MLD cannot transmit both the first and the second set of buffered BUs in a single frame exchange sequence to the non-AP MLD operating in EMLMR mode.

Various solutions for TID-to-link mapping for EMLMR mode will now be described. In a first proposal, when a non-AP MLD is operating in EMLMR mode, all links in EMLMR links are mapped to the same set of TIDs. The following further embodiments may also be implemented. The default TID-to-link mapping is used when the non-AP MLD is operating in EMLMR mode. If the non-AP MLD and an AP MLD negotiated a non-default TID-to-link mapping, the negotiated non-default TID-to-link mapping is not applied when the non-AP MLD is operating in EMLMR mode. If the non-AP MLD and the AP MLD negotiated a non-default TID-to-link mapping such that a first set of TIDs is mapped to at least one link within the EMLMR links, the first set of TIDs is considered to be mapped to all EMLMR links when the non-AP MLD is operating in EMLMR mode.

In a second proposal, a non-AP MLD that supports EMLMR operation shall use default TID-to-link mapping. The following further embodiments may also be implemented. If the non-AP MLD associates with an AP MLD, the AP MLD shall not initiate a TID-to-link mapping negotiation. If the non-AP MLD associates with an AP MLD and the AP MLD requests a TID-to-link mapping, the non-AP MLD rejects the request. If the non-AP MLD associates with an AP MLD and the non-AP MLD requests a TID-to-link mapping, the AP MLD rejects the request.

If the non-AP MLD associates with an AP MLD, and the AP MLD and the non-AP MLD negotiated a non-default TID-to-link mapping, the non-AP MLD shall not operate in the EMLMR mode. In one option, the non-default TID-to-link mapping is a mapping that different TIDs are mapped to different links within the non-AP MLD's EMLMR links. In another option, the non-default TID-to-link mapping is a mapping that non all TIDs are mapped to the non-AP MLD's EMLMR links.

If the non-AP MLD associated with an AP MLD, and the AP MLD and the non-AP MLD negotiated a non-default TID-to-link mapping, the AP MLD shall not accept the EMLMR operation of the non-AP MLD.

In a third proposed solution, the TID-to-link mapping between an AP MLD and a non-AP MLD that supports EMLMR operation has the following restriction: all links in EMLMR links are mapped to the same set of TIDs. The following further embodiments may also be implemented. If the AP MLD requests a TID-to-link mapping such that a TID is mapped to a subset of EMLMR links but is not mapped to all EMLMR links, the non-AP MLD rejects the request. If the non-AP MLD requests a TID-to-link mapping such that a TID is mapped to a subset of EMLMR links but is not mapped to all EMLMR links, the AP MLD rejects the request. If a TID-to-link mapping is negotiated such that a TID is mapped to a subset of EMLMR links but is not mapped to all EMLMR links, the non-AP MLD shall not initiate the EMLMR mode operation. If a TID-to-link mapping is negotiated such that a TID is mapped to a subset of EMLMR links but is not mapped to all EMLMR links, the AP MLD shall not accept the EMLMR operation of the non-AP MLD.

In a fourth proposed solution, when a non-AP MLD is in EMLMR operation mode, an AP transmits a frame on a link within EMLMR links, wherein the frame is mapped to a TID that is not mapped to the link. A further embodiment may include where the frame is mapped to the TID that is mapped to another link within EMLMR links.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A non simultaneous transmit and receive (NSTR) soft access point (AP) multi-link device (MLD) configured to negotiate a traffic identifier (TID)-to-link mapping with a non-AP MLD, comprising:
   a network interface configured to:
      transmit a first frame that includes information on a first group of links that the NSTR soft AP MLD proposes to map to a first TID for the non-AP MLD, wherein the first group of links includes a first link from a first set of links, wherein the first set of links is a set of links on which APs affiliated with the NSTR soft AP MLD operates and non-extreme high throughput (non-EHT) client stations (STAs) or single link STAs can associate with the APs;
      receive a second frame that includes an indication that the non-AP MLD agrees with the NSTR soft AP MLD's proposal on mapping of the first TID to the first group of links;
      determine that traffic to the non-AP MLD has the first TID that is mapped to the first group of links; and
      transmit the traffic to the non-AP MLD on the first group of links based on the determination.

2. The MLD of claim 1, wherein a second set of links is a set of links on which APs affiliated with the soft AP MLD operates and non-EHT STAs or single link STAs cannot associate with the APs.

3. The MLD of claim 1, wherein the first set of links and the second set of links satisfy at least one of the following conditions:
   a link shall be a member of the first set of links and has no corresponding link in the second set of links if it operates as an STR link pair with any other links in the soft AP MLD link set;
   a link may be a member of the first set of links and has one or more corresponding links in the second set of links if it operates as an NSTR link pair with at least one other link in the soft AP MLD link set;
   any link operates as an NSTR link pair with a link in the first set of links is a corresponding link to the link;
   any link operates as an NSTR link pair with a corresponding link to a link in the first set of links is also a conditional link to the link; and
   a link in the second set of links shall only have one corresponding link in the first set of links.

4. The MLD of claim 1, wherein the network interface if further configured to align a target beacon transmission time (TBTT) of a first beacon frame on the first link in the first set of links with a TBTT of a second beacon frame on the second set of links.

5. The MLD of claim 1, wherein group addressed frame transmission is limited to links in the first set of links.

6. The MLD of claim 1, wherein the network interface if further configured to transmit one of a beacon frame or a probe response frame on a link, wherein the one of the beacon frame and probe response frame include a first indication whether the link is a member of the first set of links.

7. The MLD of claim 6, wherein the network interface if further configured to transmit one of a beacon frame or a probe response frame on the link, wherein the one of the beacon frame and probe response frame include a second indication whether each link of a set of links associated with the soft AP MLD is a member of the first set of links.

8. The MLD of claim 6, wherein the first indication is indicated by one of an extreme high throughput (EHT) capabilities element, one bit of information, and a value of a link ID of the link.

9. The MLD of claim 8, wherein the second indication is indicated by one of a reduce neighbor report element, one bit of information, and the link ID of the link.

10. A non simultaneous transmit and receive (NSTR) soft access point (AP) multi-link device (MLD) configured to negotiate a traffic identifier (TID)-to-link mapping with a non-AP MLD, comprising:
    a network interface configured to:
       receive a first frame that includes an information on a first group of links that the non-AP MLD requests to map to a first TID, wherein the first group of links includes a first link from a second set of links, wherein the second set of links is a set of links on which APs affiliated with the NSTR soft AP MLD operates and non-extreme high throughput (non-EHT) client stations (STAs) or single link STAs are not allowed to associate with the APs;
       identify the first group of links does not include a second link from a first set of links, wherein the first set of links is a set of links on which APs affiliated with the NSTR soft AP MLD operates and non-EHT STAs or single link STAs can associate with the APs, and wherein the first link and the second link form a NSTR link pair; and
       transmit a second frame indicating that the request for mapping the first group of links to the first TID is not accepted based on the identification.

11. An access point (AP) multi-link device (MLD) transmitting a frame to a non-AP MLD that supports enhanced multi-link multiple radio (EMLMR) operation, comprising:
    a network interface configured to:
       associate with the non-AP MLD;
       negotiate a traffic identifier-to-link (TID-to-link) mapping with the non-AP MLD, wherein a first TID is mapped to a first link within EMLMR links of the non-AP MLD;
       receive a first frame from the non-AP MLD that indicates the non-AP MLD operates in EMLMR mode; and
       transmit a second frame to the non-AP MLD on a second link within EMLMR links of the non-AP MLD, wherein a TID of the second frame is the first TID based on the received first frame and the negotiation.

12. The MLD of claim 11, wherein the network interface if further configured to identify that the non-AP MLD operates in EMLMR mode, wherein the AP MLD maps all TIDs to all links.

13. The MLD of claim 11, wherein the network interface if further configured to identify that the non-AP MLD operates in EMLMR mode, wherein the AP MLD maps the first TID to all links within EMLMR links of the non-AP MLD.

\* \* \* \* \*